United States Patent
Weber et al.

(10) Patent No.: US 11,022,228 B2
(45) Date of Patent: Jun. 1, 2021

(54) SYSTEMS AND METHODS FOR A PLUG VALVE

(71) Applicant: CALDERA ENGINEERING, LC, Provo, UT (US)

(72) Inventors: Ryan Weber, Provo, UT (US); Jeffrey Robison, Provo, UT (US); Brad Allan, Provo, UT (US)

(73) Assignee: Caldera Engineering, LC, Provo, UT (US)

( * ) Notice: Subject to any disclaimer, the term of this patent is extended or adjusted under 35 U.S.C. 154(b) by 106 days.

(21) Appl. No.: 16/129,603

(22) Filed: Sep. 12, 2018

(65) Prior Publication Data

US 2020/0018412 A1   Jan. 16, 2020

Related U.S. Application Data (60) Provisional application No. 62/696,192, filed on Jul. 10, 2018.

(51) Int. Cl.
| | | |
|---|---|---|
| *F16K 1/42* | (2006.01) | |
| *F16K 25/00* | (2006.01) | |
| *F16K 5/06* | (2006.01) | |
| *F16K 5/04* | (2006.01) | |
| *F16K 5/10* | (2006.01) | |
| *F16K 25/04* | (2006.01) | |

(52) U.S. Cl.
CPC .............. *F16K 25/005* (2013.01); *F16K 1/42* (2013.01); *F16K 5/0464* (2013.01); *F16K 5/0636* (2013.01); *F16K 5/10* (2013.01); *F16K 25/04* (2013.01)

(58) Field of Classification Search
CPC ........ F16K 25/005; F16K 5/0464; F16K 5/10; F16K 25/04; F16K 1/42; F16K 1/465; F16K 1/425; F16K 1/427; F16K 1/00
USPC .................................................. 251/359, 362
See application file for complete search history.

(56) References Cited

U.S. PATENT DOCUMENTS

| | | | |
|---|---|---|---|
| 1,236,939 A | 8/1917 | Huber | |
| 1,615,942 A | 2/1927 | Grow | |
| 2,143,399 A * | 1/1939 | Abercrombie | ...... F04B 53/1022 137/540 |
| 3,487,823 A * | 1/1970 | Tarter | ........................ F01L 3/22 123/193.1 |
| 4,183,500 A | 1/1980 | Nightingale | |
| 4,315,616 A | 2/1982 | Welker | |
| 4,575,047 A | 3/1986 | Boos et al. | |
| 4,688,757 A | 8/1987 | Cook et al. | |
| 4,763,876 A * | 8/1988 | Oda | ......................... F01L 3/22 123/188.8 |
| 4,934,857 A | 6/1990 | Swanson | |

(Continued)

OTHER PUBLICATIONS

PCT; International Search Report in the PCT Parent Application No. PCT/US2019/040599 dated Sep. 25, 2019.

(Continued)

*Primary Examiner* — Kelsey E Cary
(74) *Attorney, Agent, or Firm* — Snell & Wilmer L.L.P.

(57) ABSTRACT

A valve seat is provided herein. The valve seat may include a ceramic valve seat insert positioned within a metal valve seat housing and comprising an indentation corresponding to a retention lip of the metal valve seat housing and a compliant sleeve positioned coaxially around at least a portion of an outer surface of the ceramic valve seat insert.

20 Claims, 4 Drawing Sheets

(56) References Cited

U.S. PATENT DOCUMENTS

| | | | |
|---|---|---|---|
| 5,201,335 A | 4/1993 | Osgood | |
| 2008/0060704 A1* | 3/2008 | McCarty | F16K 25/005 |
| | | | 137/375 |
| 2009/0049671 A1 | 2/2009 | O'Hara | |
| 2009/0302258 A1 | 12/2009 | Haines et al. | |
| 2010/0140530 A1 | 6/2010 | Robinson | |
| 2013/0181154 A1 | 7/2013 | Robison et al. | |
| 2013/0181155 A1 | 7/2013 | Robinson | |
| 2014/0367602 A1 | 12/2014 | Filipow et al. | |
| 2016/0018007 A1* | 1/2016 | Eckholz | F16K 47/04 |
| | | | 251/318 |
| 2018/0149279 A1 | 5/2018 | Mann, III | |
| 2019/0107218 A1* | 4/2019 | Kruppe | F16K 17/04 |
| 2020/0018422 A1 | 1/2020 | Weber et al. | |

OTHER PUBLICATIONS

PCT; Written Opinion in the PCT Patent Application No. PCT/US2019/040599 dated Sep. 25, 2019.
US; Non-Final Office Action in the U.S. Appl. No. 16/129,550 dated Jan. 27, 2020.
USPTO; Non-Final Office Action in the U.S. Appl. No. 16/129,550 dated Jul. 21, 2020.
USPTO; Notice of Allowance in the U.S. Appl. No. 16/129,550 dated Sep. 8, 2020.

* cited by examiner

SYSTEMS AND METHODS FOR A PLUG VALVE

CROSS-REFERENCE TO RELATED APPLICATION

This application claims the benefit of and priority to U.S. Provisional Application Ser. No. 62/696,192, filed Jul. 10, 2018, the contents of which are hereby incorporated by reference in their entirety.

BACKGROUND

In various industrial processes, such as in metal refining, solids and liquids may be conveyed from one vessel to another under high temperatures and high pressures. Flow control may be desired between two vessels so that the flow may be stopped from time to time.

SUMMARY

In various embodiments, a valve seat is provided comprising a ceramic valve seat insert positioned within a metal valve seat housing and comprising an indentation corresponding to a retention lip of the valve seat housing; and a compliant sleeve positioned coaxially around at least a portion of an outer surface of the valve seat insert. The compliant sleeve can comprise a pliable polymeric material, such as polytetrafluoroethylene. The valve seat housing can comprise a nickel chromium alloy, a titanium alloy, or a zirconium alloy, and further, a valve seat surface.

The valve seat surface can have a shape corresponding to a shape of and capable of receiving a portion of a plug head, such as a rounded end profile. The ceramic valve seat insert and the compliant sleeve can be press fit within the metal valve seat housing.

In various embodiments, a valve assembly is provided comprising a plug head assembly comprising a plug head and a translating shaft; a valve seat configured to receive the plug head, wherein the plug head engages with a ceramic valve seat insert, wherein the ceramic valve seat insert is positioned within the valve seat and comprises an indentation corresponding to a retention lip of the valve seat, and wherein the valve seat further comprises a compliant sleeve positioned coaxially around at least a portion of an outer surface of the valve seat insert. The compliant sleeve can comprise a pliable polymeric material, such as polytetrafluoroethylene. The valve insert can comprise a valve seat surface, which can have a rounded end profile configured to receive a portion of the plug head. The valve seat can comprise a nickel chromium alloy, a titanium alloy, or a zirconium alloy, and the plug head can comprise a ceramic material.

In various embodiments, a method for assembling a valve seat assembly is provided comprising inserting a ceramic valve seat insert into a central bore of a blank of compliant material; reducing a diameter of the portion of the blank of compliant material surrounding the valve seat insert to form a compliant sleeve; inserting the valve seat insert and the compliant sleeve into a valve seat housing; and reducing a length of the blank of compliant material to form a compliant sleeve having an end profile. The valve seat insert can comprise an indentation at a distal end. The blank of compliant material can comprise polytetrafluoroethylene. The valve seat insert can comprise a valve seat surface having a rounded end profile configured to receive a portion of a plug head. The end profile of the compliant sleeve can be flush with a portion of the valve seat surface of the valve seat insert.

BRIEF DESCRIPTION OF THE DRAWINGS

Various embodiments are particularly pointed out and distinctly claimed in the concluding portion of the specification. Below is a summary of the drawing figures, wherein like numerals denote like elements and wherein:

DETAILED DESCRIPTION

The detailed description of exemplary embodiments herein makes reference to the accompanying drawings, which show exemplary embodiments by way of illustration and its best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Moreover, many of the functions or steps may be outsourced to or performed by one or more third parties. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option.

An isolation valve may operate to control the flow of a fluid or slurry in a conduit. For example, with reference to FIG. 1, ore processing system 100 is illustrated. Ore processing system 100 may be used in connection with high pressure acid leaching ("HPAL"), pressure oxidation ("PDX") or any other mining or industrial applications where a solvent is mixed with material containing one or more metals and subjected, for example, to at least one of elevated temperatures or pressures.

Figure 1:
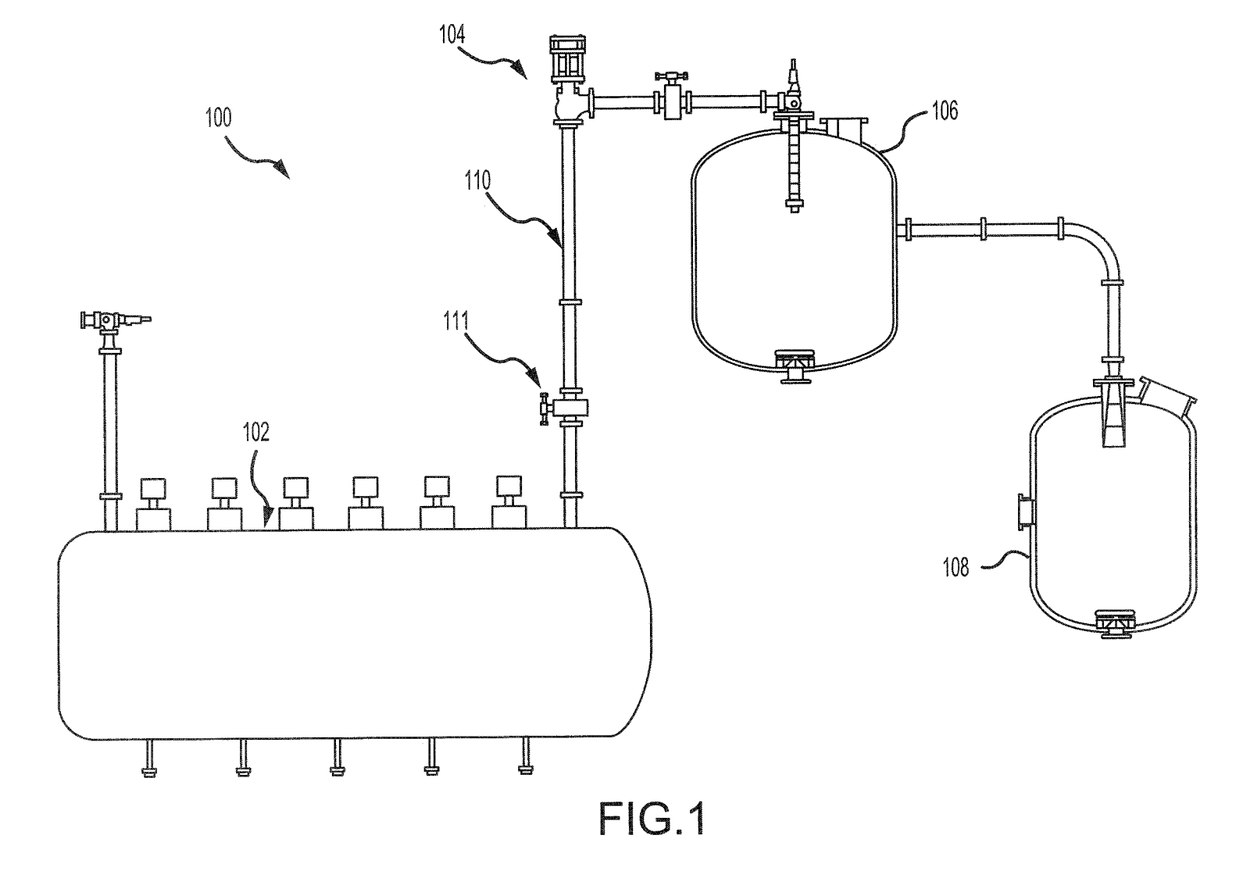
FIG. 1 illustrates an industrial process having a plug valve in accordance with various embodiments.

A mixture of solids and liquids, which may be referred to as slurry, may be subjected to high temperatures and/or high pressures in autoclave 102. For example, ore may be mixed with strong acids (e.g. $H_2SO_4$) or strong bases (e.g., NaOH or $NH_3$) and may be subjected to temperatures of from 80° C. to 300° C. or greater and total pressures of from about 10 psi (~68 kPa) to 900 psi (~6,205 kPa). The slurry may have a pH of between 1 to 4 (in an acidic application) or between about 10 to 14 (in a basic application). Such a process may be referred to as pressure leaching. An isolation valve, such as a plug valve 104, may be positioned between autoclave 102 and a high pressure flash tank 106, and may act to stop flow between the two components of ore processing system 100. Low pressure flash tank 108 is also illustrated for reference. Plug valve 104 may be paired with isolation valve 111. Isolation valve 111 may be a ball valve, plug valve, or any other suitable valve. Although described with reference to particular applications and operating conditions, isolation valve 111 can be used in any suitable process.

Autoclave 102 may be sized according to industrial need, but is in various embodiments greater than 200 m³. The size of discharge line 110 may also vary, but is in various embodiments greater than 50 mm in diameter.

Plug valve 104 may comprise an angle-type isolation valve, and, in various embodiments, may be considered a full bore or nearly full bore valve. Plug valve 104 may be configured in a "flow under" orientation in that flow tends to force the valve open, in contrast to a "flow over" valve where flow tends to force the valve closed. In that regard, slurry is configured to flow from autoclave 102 to high pressure flash tank 106.

In other embodiments, plug valve 104 can comprise a non-isolation valve, wherein plug valve 104 is used to reduce or regulate pressure and/or flow (as opposed an isolation valve, which operates to stop flow through the valve). For example, plug valve 104 can comprise a vent valve, a flash letdown valve, or a level control valve, among other types of non-isolation valves.

In operation, plug valve 104 may be actuated to a closed position to fluidly isolate autoclave 102 from high pressure flash tank 106. In response to actuation to an open position, plug valve 104 may experience slurry flow at high velocities, temperatures and pressures as slurry flows from autoclave 102 to high pressure flash tank 106.

Figure 2:
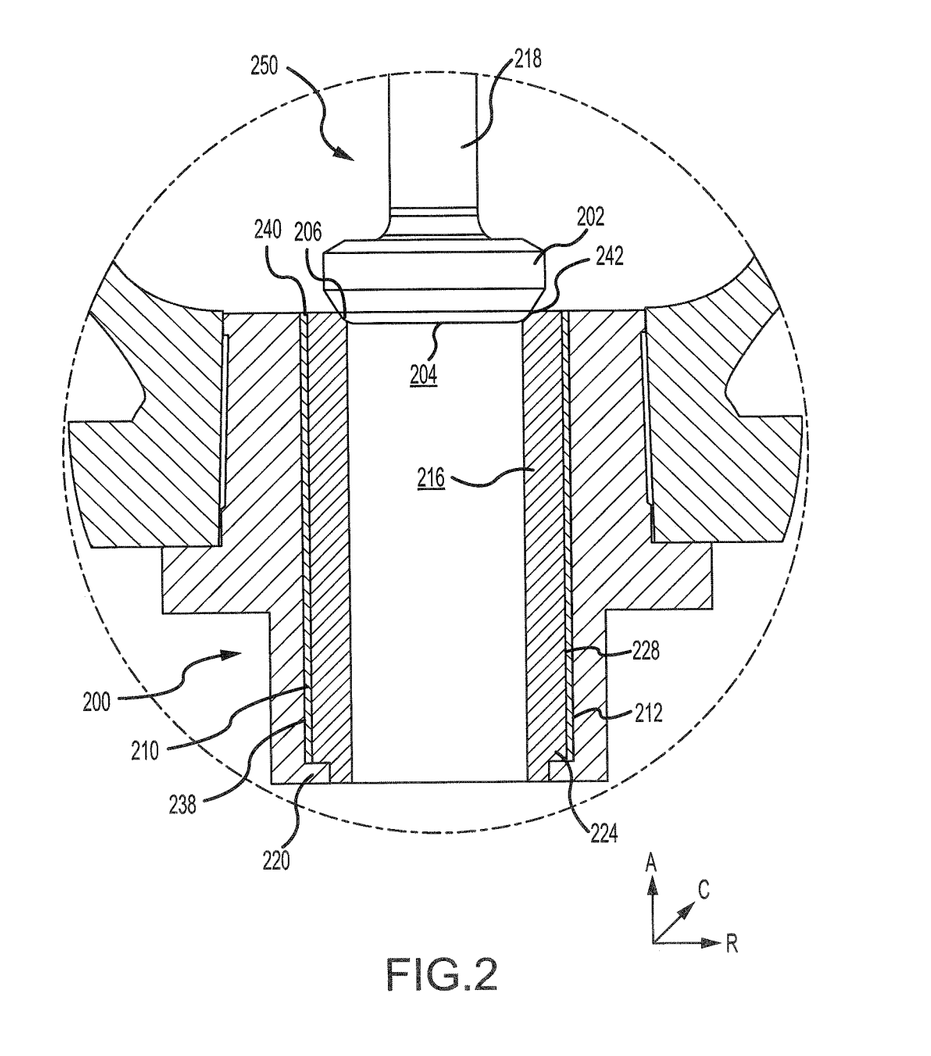
FIG. 2 illustrates a cross section view of a plug valve seat configuration in accordance with various embodiments.

With reference to FIG. 2, a plug head assembly portion of plug valve 104 is shown in cross section. Axial-Radial-Circumferential (A-R-C) axes are shown for convenience in this and other Figures. It should be noted that a first component shown displaced in a positive axial direction with respect to second component may be referred to as distal to the second component. Plug head assembly 250 comprises translating shaft 218 and plug head 202. Plug head 202 may comprise one or more materials. In various embodiments, plug head 202 can comprise one or more metals, such as, for example, various steel alloys, stainless steel, titanium, ceramics such as silicon carbide (SiC), boron carbide ($B_4C$), tungsten carbide (WC), and zirconia ($ZrO_2$), and nickel chromium alloys, such as an austenitic nickel-chromium alloy such as the austenitic nickel-chromium alloy sold under the trademark INCONEL. Nickel chromium alloys may be well suited to high temperature environments. Conventional autoclave isolation valve trim may comprise metal with a thin ceramic coating. In operation, the thin ceramic coating may soon be abraded from the sliding action of the trim, damaged by crushing large solid pieces in the slurry flow and eroded by the passing of the high-velocity slurry. In such applications, monolithic ceramics may provide much better resistance to these abrasion, crushing and erosion potentials. Heretofore, ceramic trim have not been used in conventional autoclave ball valves due to great difficulty in engineering and constructing balls and seats that will not prematurely fail due to the brittle nature of the ceramic material. This tendency to failure of ball valve ceramic trim naturally increases as the trim size increases. In various embodiments, the angle plug configuration and operation make the engineering and construction of a durable ceramic trimmed valve practical.

As noted herein, practical valve trim materials exclude ceramics. Conventional autoclave isolation ball valve operation tends to abrade the ball and seat during opening and closing, slurry flow erodes the ball and seat during opening and closing and hard, solid particles suspended in the slurry trap and crush as the ball closes on the seat, thereby damaging the sealing elements (or surfaces) of the seat and/or ball. A repeated combination of these actions soon initiates a leak path for high-pressure, highly erosive flashing flow which will quickly and dramatically increase the size of the leak path and potentially destroy the seat, ball and valve body. This results in an autoclave shutdown and the associated large production losses.

In various embodiments, plug head 202 may comprise a ceramic material, as may valve seat insert 216, as described herein. Ceramics are especially well suited to high erosion applications. Plug head 202 may have a varying geometry 204. For example, geometry 204 may be spherical, parabolic, flat, or any other suitable geometric configuration. As depicted in FIG. 2, geometry 204 is flat.

In a closed position, plug head 202 mates (e.g. contacts) with valve seat assembly 200 about valve seat surface 206. When plug valve 104 is in the closed position, valve seat surface 206 circumferentially surrounds plug head 202. In that regard, contact between plug head 202 and valve seat surface 206 acts to resist and/or stop the flow of a fluid or slurry past plug head 202. Thus, in a closed position, plug valve 104 prevents the flow of a fluid or slurry past plug head 202.

In various embodiments, valve seat assembly 200 comprises valve seat insert 216, sleeve 210, and valve seat housing 212. Valve seat housing 212 may comprise one or more metals, for example, various steel alloys, stainless steel, titanium, and nickel chromium alloys, such as an austenitic nickel-chromium alloy such as the austenitic nickel-chromium alloy sold under the trademark INCONEL. Nickel chromium alloys may be well suited to high temperature environments.

In various embodiments, valve seat insert 216 comprises a ceramic material. For example, valve seat insert 216 can comprise a ceramic material, and valve seat housing 212 can comprise a metallic material. In such embodiments, the ceramic material of valve seat insert 216 comprises a different coefficient of thermal expansion (CTE) than the metallic material of valve seat housing 212. As such, during operation of plug valve 104, the metallic material of valve seat housing 212 can linearly expand at a different rate and magnitude than the ceramic material of valve seat insert 216. In general, metals have higher coefficients of thermal expansion than fine ceramics, creating a significant difference in the overall expansion of valve seat insert 216 (which linearly expands relatively less) and valve seat housing 212 (which linearly expands relatively more). For example, INCONEL alloys can range in coefficients of thermal expansion from approximately $13*10^{-6}/°$ C. to approximately $16*10^{-6}/°$ C., and fine ceramics can range in coefficients of thermal expansion from approximately $2*10^{-6}/°$ C. to approximately $11*10^{-6}/°$ C. As such, the greater degree of linear expansion in the metal material of valve seat housing 212 produces significant axial tensile loads on the ceramic material of valve seat insert 216, which can lead to failure of the ceramic material.

In various embodiments, a sleeve 210 surrounds at least a portion of an outer surface 228 of the valve seat insert 216. For example, sleeve 210 can be positioned coaxially between outer surface 228 of valve seat insert 216 and an inner surface 238 of valve seat housing 212. Sleeve 210 may comprise a pliable material. In that regard, sleeve 210 may comprise various thermoplastics and/or thermosets and/or polymeric materials. For example, sleeve 210 can comprise rigid or semi-rigid polytetrafluoroethylene (PTFE). In various embodiments, being elastically deformable, sleeve 210 allows relative movement between valve seat insert 216 and valve seat housing 212 in response to fluid or slurry activity and/or in response to thermal expansion. Stated another way, sleeve 210 reduces the transfer of axial tensile load caused by the difference in linear expansion of valve seat housing 212 and valve seat insert 216 by allowing the two components to slip axially in relation to each other. In particular, in response to an increase in temperature, valve seat housing 212 may expand in a radial direction to a greater degree than valve seat insert 216, as the CTE of valve seat housing 212 is greater than that of valve seat insert 216. The CTE of sleeve 210, however, is greater than the CTE of valve seat housing 212 and valve seat insert 216, and thus sleeve 210 expands in a radial direction to assist in retention of valve seat insert 216 in valve seat housing 212. It is noted that ceramic materials, such as those that may be used in valve seat insert 216, may be relatively resistant to compression loads. In addition to expansion in the radial direction, in response to an increase in temperature, valve seat housing 212 may expand in an axial direction to a greater degree than valve seat insert 216. In that regard, a tensile load is exerted by valve seat housing 212. If valve seat insert 216 were directly contacted by valve seat housing 212, this tensile load may be transferred to valve seat insert 216, imparting a tensile load or a shear load on valve seat insert 216, which may be detrimental. However, since sleeve 210 is disposed between valve seat insert 216 and valve seat housing 212, sleeve 210 mitigates the tensile load. Moreover, in embodiments where sleeve 210 comprises PTFE, given the low coefficient of friction of PTFE, valve seat housing 212 may beneficially slip with respect to sleeve 210. In this manner, valve seat housing 212 may be allowed to expand axially without imparting a tensile or shear load on valve seat insert 216, tending to decrease the opportunity for valve seat insert 216 to fail.

In various embodiments, sleeve 210 comprises a non-polymeric material, such as a silicon-based compound or a metallic material. For example, at elevated temperatures (such as, for example, above 260° C., a silicon-based compound or metallic material may have a higher CTE, which may improve performance of sleeve 210 (as compared to the performance of a polymeric material at the same elevated temperature).

In various embodiments, valve seat housing 212 comprises a retention lip 220 distal to valve seat surface 206. For example, retention lip 220 can correspond to an indentation 224 of valve seat insert 216, also positioned distal to valve seat surface 206. In such embodiments, retention lip 220 engages with indentation 224 and prevents valve seat insert 216 from dislodging from or disengaging with valve seat housing 212 during flow through plug valve 104.

The intended material flowing through an angle plug valve, and the velocities at which such material is intended to flow, is important in valve design. In various embodiments, a slurry comprising a solid phase and a liquid phase is intended to flow through angle plug valves. According to compressible flow theory and the thermodynamics of a multiphase system, the flow at the throat is choked and flowing at the local speed of sound, according to various embodiments. The flow before the throat behaves like an incompressible fluid and after the throat like a compressible, supersonic fluid. As the area expands downstream of the throat, the local properties of the fluid are a function of the area ratio of the throat to the local flow area and a function of the upstream fluid supply thermodynamic properties. The supersonic flow properties immediately downstream of the throat are independent of the flow conditions far downstream such as the downstream tank pressure. As the area expands, the velocity increases and the fluid density decreases. These properties are mathematically modeled according to the equations, references and description by Smith in U.S. Pat. No. 7,237,574, which is incorporated herein by reference in its entirety.

The seat face gap flow ($A_g$) area can be calculated as the seat face ID times the face gap ($A_g = D_{face} \times g_{race}$). As the valve seat assembly 200 closes, the annular flow area between the plug head 202 and valve seat insert 216 decreases until the face of the plug cylindrical projection just begins to enter the bore diameter. This threshold minimum flow area coincides with a significantly larger seat face gap flow area ($A_g$). As the flashing flow expands after the throat, the velocity increases and the fluid density decreases. In various embodiments, the geometrical dimensions of the plug and seat pair are made such that the velocity and density of the flashing flow at $A_g$ may reach velocities of 100 m/s or more with a density 25% or less that of the fluid density upstream of the throat. The correct geometrical area ratio is determined using the aforementioned flow modeling method. For example, upstream source pressure of slurry may be between 5 bar and 60 bar, temperature may be between, 100 degrees C. and 300 degrees C., and slurry density may be between 900 kg/m$^3$ and 1,200 kg/m$^3$. For example, in various embodiments, upstream source pressure of slurry may be between approximately 47 bar, temperature may be 253 degrees C., and slurry density may be 1,113 kg/m$^3$. With the angle plug valve open in various embodiments, flow area ratio may be between 1/60 and 1/80, velocity may be between 80 m/s and 120 m/s, and slurry density may be between 170 kg/m$^3$ and 190 kg/m$^3$. With the angle plug valve open, in various embodiments, flow area ratio may be approximately 1/73, velocity may be 102 m/s, and slurry density may be 181 kg/m$^3$.

Figure 3A:
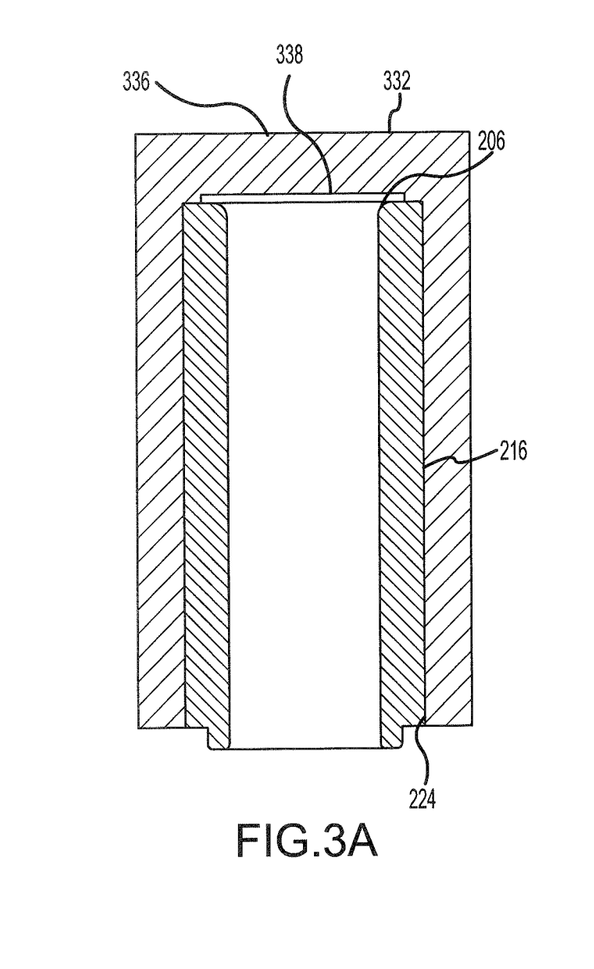
FIG. 3A illustrates a cross section view of a partially-assembled valve seat assembly in accordance with various embodiments.
Figure 3B:
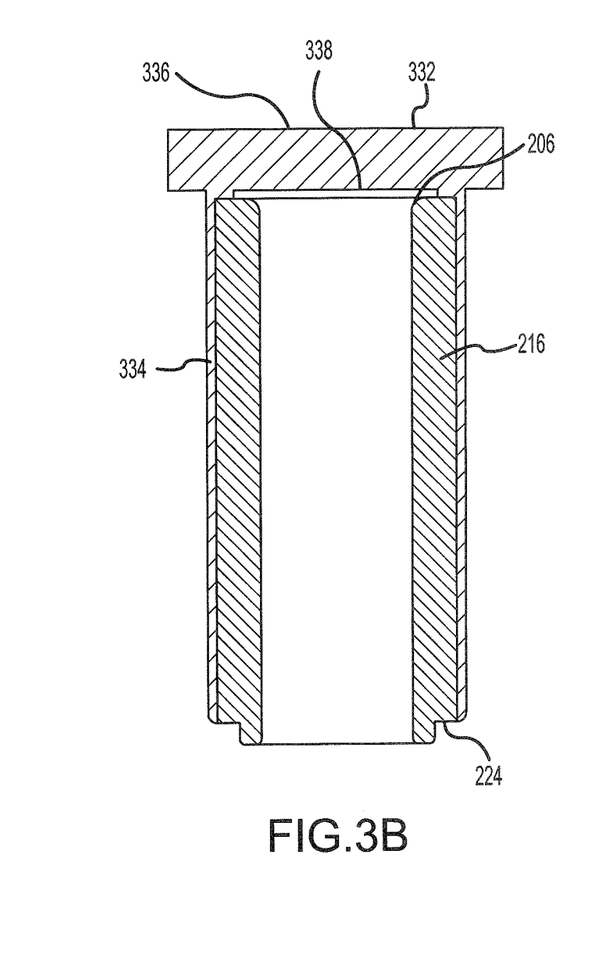
FIG. 3B illustrates another cross section view of a partially-assembled valve seat assembly in accordance with various embodiments.
Figure 3C:
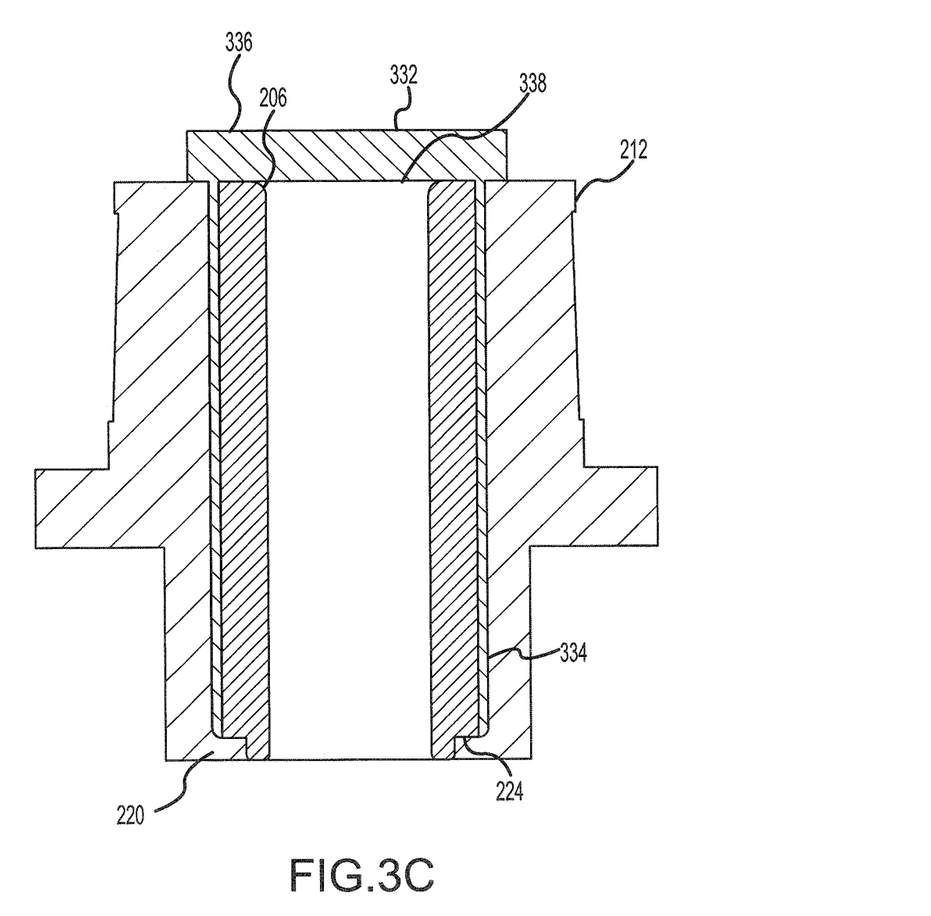
FIG. 3C illustrates a cross section of an assembled valve seat assembly in accordance with various embodiments.

With reference to FIGS. 3A-3C, a method for assembling a valve assembly in accordance with various embodiments is illustrated. With reference to FIG. 3A, valve seat insert 216 is inserted into a compliant material blank 332. For example, valve seat insert 216 is pressed into the central opening of compliant material blank 332.

Compliant material blank 332 can comprise a piece of compliant material, such as rigid or semi-rigid polytetrafluoroethylene, with a central bore having a diameter sized to correspond with the outer diameter of valve seat insert 216. In various embodiments, compliant material blank 332 comprises a square or round tube of compliant material. In other embodiments, compliant material blank 332 comprises a solid square, rectangular, or round shape into which a central bore is formed by, for example, boring or machining.

With reference to FIG. 3B, compliant material blank 332 can be reduced to a reduced outer diameter 334. For example, reduced outer diameter 334 can correspond to a desired thickness of sleeve 210, such as, for example, between about 1.5 millimeters and about 5 millimeters. In various embodiments, an outer dimension of compliant material blank 332 is reduced such that an extended end 336, protruding from an end 338 of valve seat insert 216, remains at a larger dimension than reduced outer diameter 334. For example, compliant material blank 332 can comprise a length greater than the length of valve seat insert 216, such extended end 336 can protrude from valve seat surface 206 of valve seat insert 216.

With reference to FIG. 3C, after compliant material blank 332 is reduced to a reduced outer diameter 334 (forming sleeve 210), sleeve 210 and valve seat insert 216 can be inserted into valve seat housing 212. For example, sleeve 210 and valve seat insert 216 can be sized such that at room temperature, the two components fit within valve seat housing 212 as a press fit, a friction fit, or a threaded fit. Further, sleeve 210 can be heated, inserted into valve seat insert 216, and allowed to cool, resulting in a heat shrink type fit. In various embodiments, sleeve 210 and valve seat insert 216 are inserted into valve seat housing 212 from the proximal end, such that retention lip 220 and indentation 224 are aligned and in contact with each other.

With reference back to FIG. 2, extended end 336 of compliant material blank 332 can be removed to form an end profile 240 of sleeve 210. For example, end profile 240 can be flush with end 242 of valve seat insert 216, and/or valve seat housing 212, forming a relatively flat end profile.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, and any elements that may cause any benefit or advantage to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "various embodiments", "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(t) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

The invention claimed is:

1. A valve seat comprising:
   a ceramic valve seat insert positioned within a metal valve seat housing and comprising an indentation corresponding to a retention lip of the metal valve seat housing; and
   a sleeve positioned coaxially around at least a portion of an outer surface of the ceramic valve seat insert, the sleeve extending the majority of a full length of the ceramic valve seat insert, wherein a proximal portion of the sleeve is in contact with the retention lip.

2. The valve seat of claim 1, wherein the sleeve comprises a pliable polymeric material.

3. The valve seat of claim 2, wherein the sleeve comprises polytetrafluoroethylene.

4. The valve seat of claim 3, wherein the metal valve seat housing comprises one of a nickel chromium alloy, a titanium alloy, and a zirconium alloy.

5. The valve seat of claim 4, wherein the ceramic valve seat insert comprises a valve seat surface.

6. The valve seat of claim 5, wherein the valve seat surface has a shape corresponding to a shape of a portion of a plug head.

7. The valve seat of claim 6, wherein the valve seat surface comprises a rounded end profile.

8. The valve seat of claim 2, wherein the ceramic valve seat insert and the sleeve are press fit within the metal valve seat housing.

9. A valve assembly comprising:
   a plug head assembly comprising a plug head and a translating shaft;
   a valve seat configured to receive the plug head, wherein the plug head engages with a ceramic valve seat insert, wherein the ceramic valve seat insert is positioned within the valve seat and comprises an indentation corresponding to a retention lip of the valve seat, and
   wherein the valve seat further comprises a sleeve positioned coaxially around at least a portion of an outer surface of the ceramic valve seat insert, the sleeve extending the majority of a full length of the ceramic valve seat insert, wherein a proximal portion of the sleeve is in contact with the retention lip.

10. The valve assembly of claim 9, wherein the sleeve comprises a pliable polymeric material.

11. The valve assembly of claim 10, wherein the sleeve comprises polytetrafluoroethylene.

12. The valve assembly of claim 9, wherein the ceramic valve seat insert comprises a valve seat surface.

13. The valve assembly of claim 12, wherein the valve seat surface comprises a rounded end profile configured to receive a portion of the plug head.

14. The valve assembly of claim 9, wherein the valve seat comprises one of a nickel chromium alloy, a titanium alloy, and a zirconium alloy.

15. The valve assembly of claim 14, wherein the plug head comprises a ceramic material.

16. A method for assembling a valve seat comprising:
   inserting a ceramic valve seat insert into a central bore of a blank of material;
   reducing a diameter of the portion of the blank of material surrounding the ceramic valve seat insert to form a sleeve;
   inserting the ceramic valve seat insert and the sleeve into a valve seat housing, wherein the ceramic valve seat insert comprises an indentation corresponding to a retention lip of the valve seat housing; and reducing a length of the blank of compliant material to form a sleeve having an end profile, the sleeve extending the majority of a full length of the ceramic valve seat insert, the sleeve comprising a proximal portion in contact with the retention lip of the valve seat housing.

17. The method of claim 16, wherein the ceramic valve seat insert comprises an indentation at a distal end.

18. The method of claim 16, wherein the blank of material comprises polytetrafluoroethylene.

19. The method of claim 16, wherein the ceramic valve seat insert comprises a valve seat surface having a rounded end profile configured to receive a portion of a plug head.

20. The method of claim 19, wherein the end profile of the sleeve is flush with a portion of the valve seat surface of the ceramic valve seat insert.

\* \* \* \* \*